United States Patent [19]

Schumacher et al.

[11] 3,964,892

[45] June 22, 1976

[54] APPARATUS FOR ADVANCING PARTICULATE MATERIAL

[75] Inventors: Ray F. Schumacher, Peninsula; David J. Prasek, Parma, both of Ohio; Howard L. Van Stone, Nashville, Tenn.

[73] Assignee: Ferro Corporation, Cleveland, Ohio

[22] Filed: May 12, 1975

[21] Appl. No.: 576,706

[52] U.S. Cl. ................................ 65/328; 65/335; 214/18 GD; 214/18 V; 214/17 CB
[51] Int. Cl.² .................... C03B 5/26; C03B 3/00
[58] Field of Search ............ 65/335, 328, 347, 327; 214/18 GD, 17 CB, 18 V

[56] References Cited
UNITED STATES PATENTS

| 884,620 | 4/1908 | Sheldon | 214/18 |
|---|---|---|---|
| 1,834,631 | 12/1931 | Mulholland | 65/335 X |
| 3,109,045 | 10/1963 | Silverman | 65/335 X |
| 3,145,855 | 8/1964 | Plugge et al. | 214/17 CB |
| 3,209,925 | 10/1965 | Coenen | 214/17 CB |
| 3,265,225 | 8/1966 | Louks | 214/17 CB |
| 3,460,932 | 8/1969 | Keefer | 65/327 X |
| 3,663,192 | 5/1972 | Perry | 65/335 X |
| 3,717,450 | 2/1973 | Loughridge et al. | 65/347 X |

Primary Examiner—Robert L. Lindsay, Jr.
Assistant Examiner—Frank W. Miga
Attorney, Agent, or Firm—Milton L. Simmons; Wesley B. Taylor

[57] ABSTRACT

Apparatus is disclosed for advancing particulate material, such as glass batch, to a receiver having an opening to receive the material, in which a distributing arm is mounted with respect to the opening to extend radially from an inner end to an outer end in a generally horizontal plane. The arm is rotatable about a vertically disposed axis adjacent its inner end and has a trough extending along its length to receive the particulate material. A roller mounted on the arm adjacent its outer end supports the arm and rides about the periphery of the opening during rotation of the arm about is inner end. This action of the roller also actuates conveyor means within the trough of the arm to advance the material along the arm from which it is discharged.

17 Claims, 9 Drawing Figures

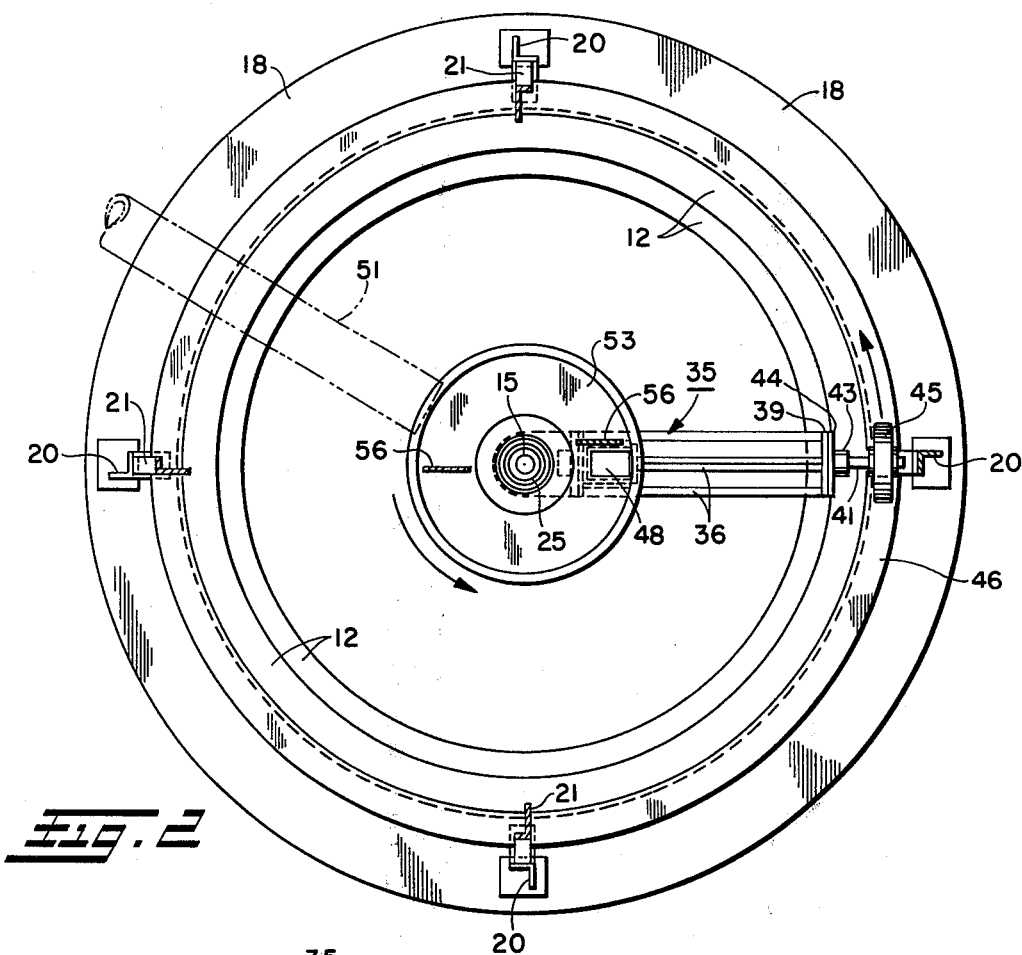
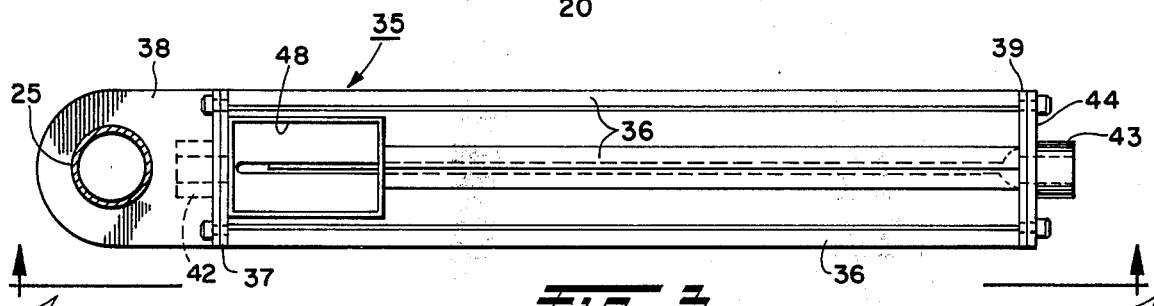
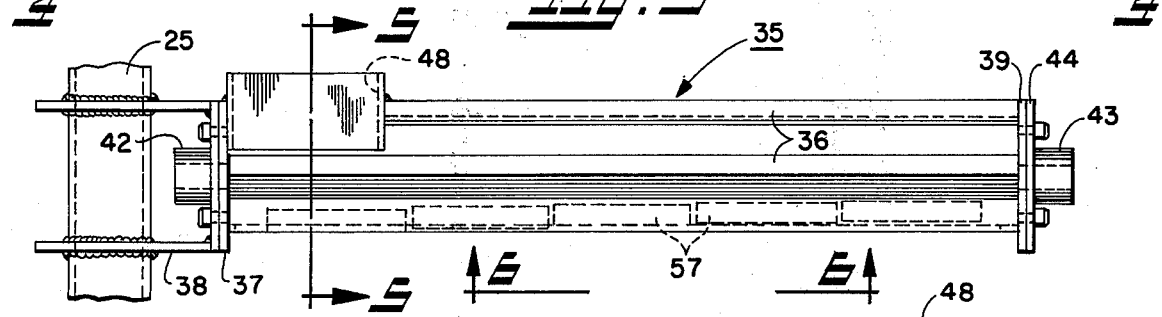

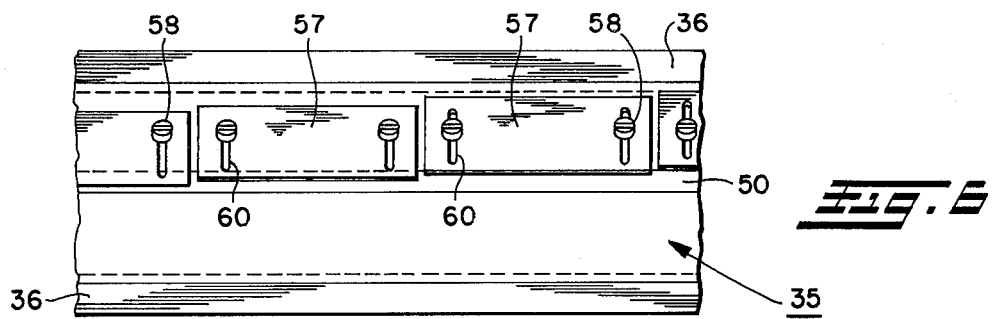
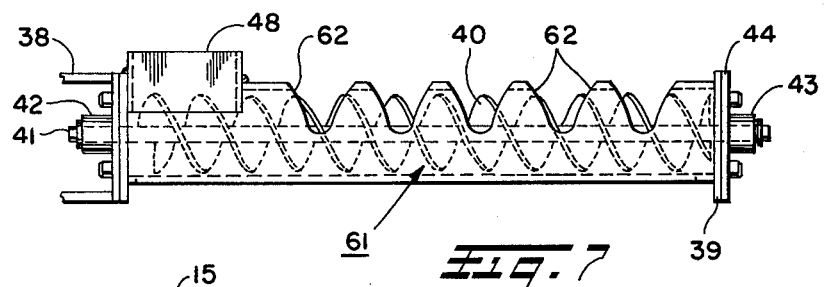
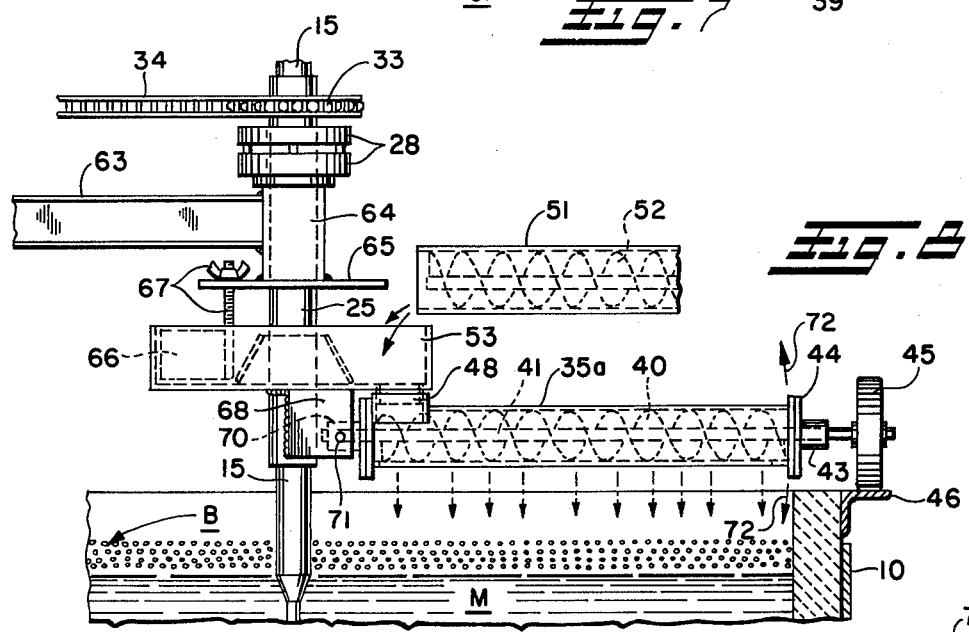
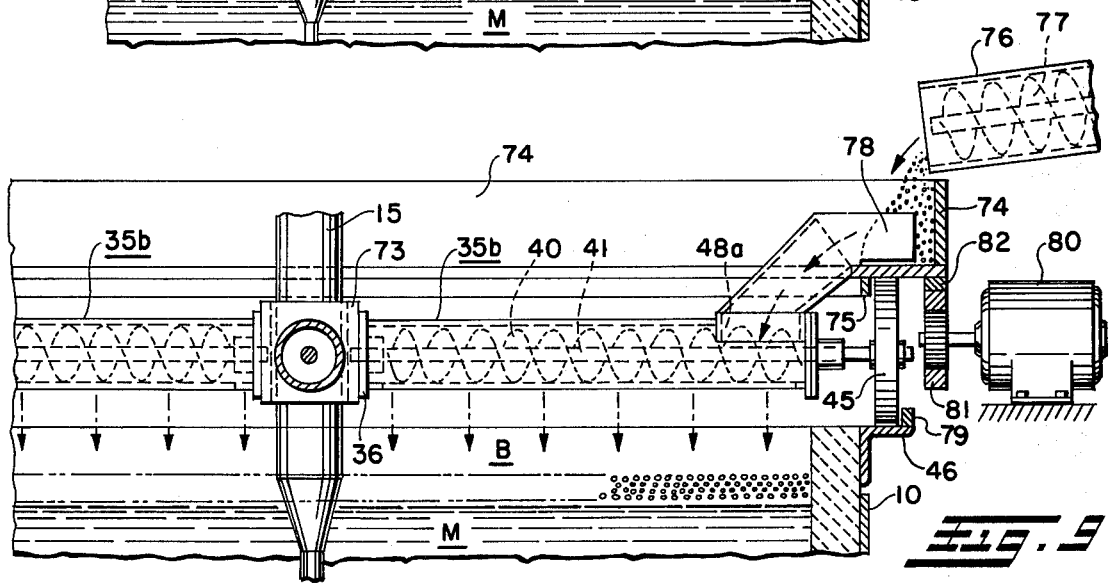

APPARATUS FOR ADVANCING PARTICULATE MATERIAL

BACKGROUND OF THE INVENTION

For purposes of illustration the present apparatus is described in connection with feeding particulate glass batch material for which it is especially adapted, although the apparatus can be used to advance other particulate, pulverulent or granular materials such as coal dust to a stoker.

It is well known to produce glass products from a particulate batch by heating the batch well above its fusion temperature to form a molten mass and then processing the molten mass to a desired product form, whether by drawing, molding, blowing, or still other techniques. Many diverse problems arise in suitably melting a glass batch and obtaining a refined melt of uniform composition free of stones, occlusions, and the like. Many of these problems, in turn, are due to the manner of feeding and processing the glass batch prior to the time it has been completely converted to the molten state.

As an example, the rate of feeding glass batch may vary, causing the level of molten glass in a furnace to rise and fall through relatively wide limits over a period of time and introducing irregular operation. This is apt to result in a non-uniform melt. Still other operational problems arise such as segregation of batch particles. Or the intended formulation of the glass may be unavoidably altered due to dusting of the batch and loss of batch dust as effluent as through an exit stack, especially in the case of gas-fired furnaces.

It would, therefore, advance the art to provide improved apparatus for advancing glass batch and other particulate material to a glass melting furnace or other receiver.

SUMMARY OF THE INVENTION

The principal object of the present invention is to advance particulate material to a receiver therefor in such a manner as to provide a thin, continuous, uniform layer of the material having no repeating pattern. A relatively small amount of the material is continuously deposited in accordace with the present invention and, in the case of a glass-melting furnace, the layer of particulate material deposited floats atop previously melted batch and is, itself, gradually fused and assimilated into the molten bath. In this manner, there is a substantially constant rate of feed with resultant uniform melting and little or no segregation. The opportunity for dusting is minimized if not eliminated, since relatively little batch dust is present in the furnace at any one time.

This and related objects are realized by the present apparatus which, in one form, comprises a distributing arm adapted to be mounted over an opening in a receiver into which the particulate material is to be advanced. The arm is directed in a radial direction in a generally horizontal plane so as to extend from an inner end placed over a central area of the opening to an outer end placed adjacent to a peripheral area of the opening. The arm is rotated about a vertically disposed axis adjacent its inner end and has a trough extending along its length to receive the particulate material. A roller mounted on the arm adjacent its outer end supports the arm and rides about the periphery of the opening during rotation of the arm about its inner end. This action of the roller also actuates conveying means, such as a screw conveyor, within the trough of the arm to advance the material along the arm from which it is discharged through exit means stationed along the arm.

In operation, the arm leaves a thin but uniform veil of particulate material having a width substantially equal to the length of the arm and covering a generally circular area described by the arm as a radius. However, because the veil tends to spread out, it is not limited to the pattern of deposition. Especially in the case of a glass-melting operation, due to its own weight and lubricity of the underlying melted glass, the veil seeks its own level, reaching to the walls of the receiver so as to form a complete cover of the molten bath. As the arm rotates, the feed of material is continuous, and an even layer of particulate material accumulates which is gradually fused and becomes part of the melt in a glass-melting operation.

The power for rotating the arm may be applied at either the inner or outer ends of the arm. Optionally, the present apparatus may have storage bins which initially receive the particulate material and are equipped with scrapers to push the material onward to the rotating arm. Additionally, exit means on the arm may have adjusting means for varying the amount of discharge of the material through the exit means.

BRIEF DESCRIPTION OF THE DRAWING

In the accompanying drawing:

FIG. 2 is a section of FIG. 1 taken on the line 2—2;

FIG. 3 is an enlarged, plan view of the distributing arm of FIG. 1;

FIG. 4 is a side view of FIG. 3 taken on the plane of the line 4—4;

FIG. 5 is a section of FIG. 4 taken on the line 5—5;

FIG. 6 is a fragmentary, bottom plan view of FIG. 4 taken on the plane of the line 6—6;

FIG. 7 is a side view of a modified form of a distributing arm designed for lateral discharge of particulate material;

FIG. 8 is a fragmentary, side view of a modified form of the present apparatus, similar to FIG. 1, showing an optional mounting of the distributing arm to adapt it for vertical pivoting; and FIG. 9 is an enlarged, fragmentary side view of a modified form of the present apparatus in which the drive for rotating the distributing arm is applied adjacent its outer end.

DESCRIPTION OF THE PREFERRED EMBODIMENTS

Figure 1:
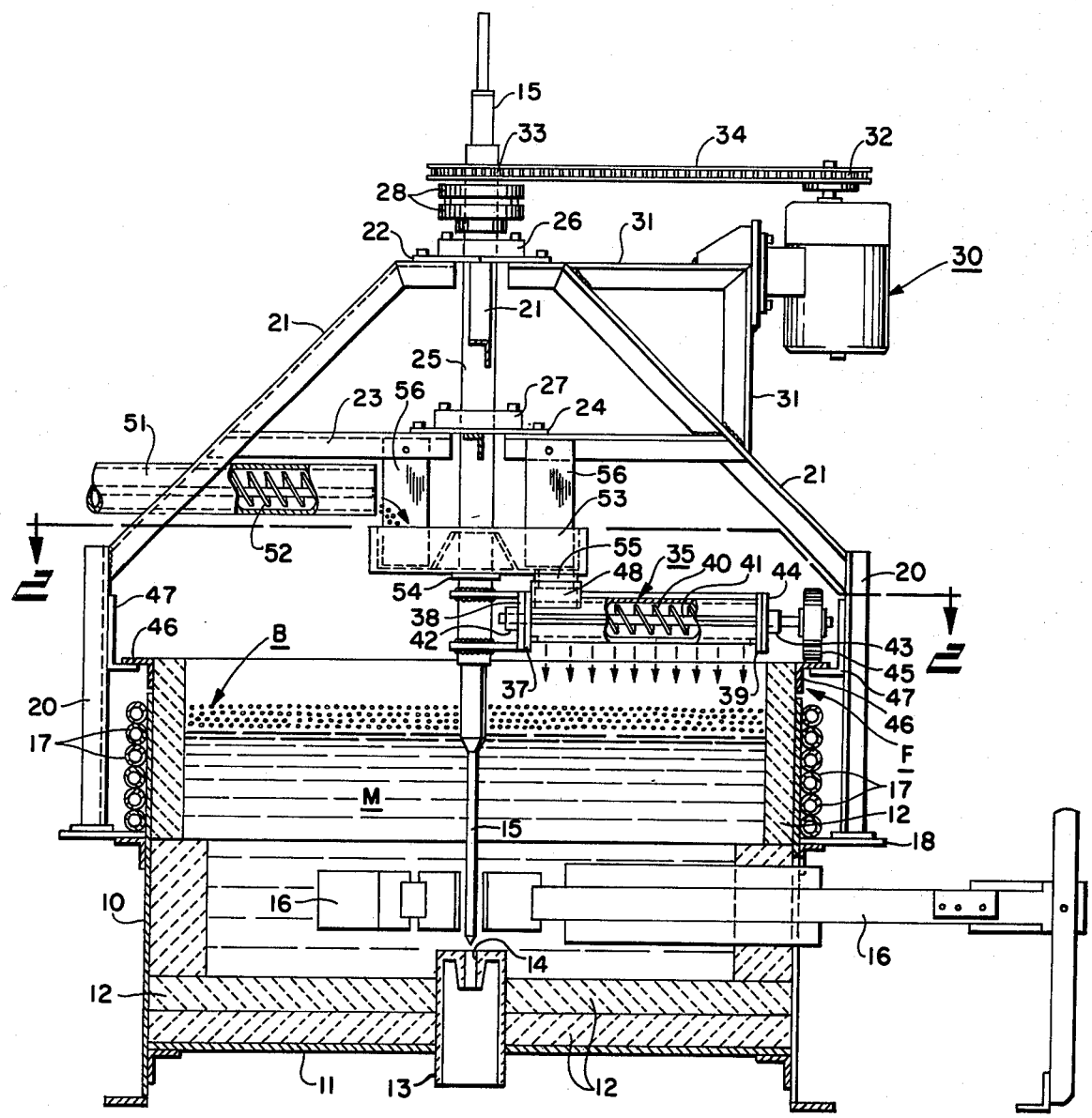
FIG. 1 is a side elevational view, partly in section of a glass-melting furnace having apparatus of the present invention to advance glass batch into the furnace.

For purposes of illustration the present apparatus is described as used with a glass melting furnace and, more particularly, with an electric resistance furnace of the type having a central bottom outlet through which flow of molten glass is regulated by a needle-valve arrangement. The apparatus is, however, useful wherever particulate material is to be advanced to a receiver having an opening through which to receive the material.

Referring initially to the embodiment of FIGS. 1 through 6, an electric resistance, glass melting furnace is generally indicated at F and may be of the type described in U.S. Pat. Nos. 2,817,695; 2,874,201; and 3,216,815, all issued to Hartwig. In general, furnace F includes a circular outer metal shell 10 and a flat bottom 11, both of which are suitably lined with high temperature resistant refractory 12. A tubular outlet 13 for tapping the molten glass is centrally located in floor 11 and has a reduced opening 14 which cooperates with a cane 15 to regulate the outlet flow of molten glass. Three main electrodes 16, spaced 120° apart, are mounted to pass through shell 10 and refractory 12 in substantially the same horizontal plane and are connected outside of the furnace to a three-phase source of alternating current of the required capacity in a standard manner known in the art. The resistance to the passage of electric current among electrodes 16 creates heat sufficient to melt batch fed to furnace F. After the batch is melted, the resulting molten glass continues to conduct the current such that quite high temperatures can be generated. To protect shell 10 from the heat, cooling coil 17 jackets the upper portion and rests on an outwardly extending shelf 18 passing around the furnace.

Shelf 18 also supports a superstructure of angle irons which carry the apparatus of the present invention. A series of upstanding posts 20 spaced circumferentially about furnace F and welded to shelf 18 carry upwardly and inwardly directed angle irons 21 which meet to support a bearing plate 22. Cross-supports 23 extend from angle irons 21 inwardly and support at their inner ends another bearing plate 24. Wherever they meet, the described supporting members may be suitably fixed to one another as by welding.

The described superstructure supports the present apparatus over furnace F while the apparatus advances particular glass batch or the like to the furnace. In this embodiment, a hollow tube 25 extends vertically into the central area of the furnace and is conventionally mounted for rotation about a longitudinal axis by a bearing 26 on plate 22 and by a second bearing 27 on plate 24. Locking rings 28 secured to tube 25 keep it from falling through the bearings, while a standard alternating current motor and gear reducer, generally indicated at 30 and supported to one side of the superstructure by angle irons 31, rotates tube 25 by sprockets 32 and 33 and a drive chain 34 trained about the sprockets.

An arm generally indicated at 35 is secured adjacent the bottom of tube 25 and just above the top of furnace F. To this arm glass batch is fed and distribued as the arm rotates with tube 25. Arm 35 comprises an enclosed tube of stainless steel having reinforcing angle bars 36 secured to and extending along its sides and top (FIG. 5). Plates 37 and 39 seal off the ends of arm 35. Plate 37 is suitably secured as by welding to the bight section of a U-shaped bracket 38, the legs of the bracket having holes to pass tube 25 to which the legs are secured by welding.

The distributing arm 35 includes its own drive mechanism. A screw conveyor 40 fixed to a shaft 41 has its flight designed to move particulate material from left to right as viewed in FIG. 1 with counterclockwise movement of the arm as viewed in FIG. 2. Shaft 41 extends longitudinally through arm 35 at both ends and is conventionally journaled for rotation in slit 50 bearing 42 at its inner end and in a bearing 43 on a bearing plate 44 which is bolted to outer end plate 39. At the outer end, shaft 41 carries a fixed roller 45 of metal or temperature resistant rubber which rides a track 46 defined by a curved angle iron extending entirely around the furnace top. Angled supports 47 fixed to posts 20 undergird track 46. The batch or other particulate material reaches arm 35 and screw conveyor 40 through a rectangular opening 48 located at the inner end of arm 35 (FIGS. 3 and 5). A slit (FIG. 6) extends along the bottom of arm 35 and defines exit means through which the particlate material is discharged into furnace F.

Batch feed may be manually and periodically advanced to arm 35 through opening 48 without affecting the rate of its discharge from the arm, as long as the supply of batch in the arm is not exhausted, since the discharge is continuous and controlled only by slot 50. However, it is preferred to incorporate mechanical means with the apparatus to perform this function as well. In the embodiment illustrated, a feeding tube 51 has a screw conveyor 52 which pushes particulate batch feed as from storage into a circular bin 53. The bin has a central opening to fit about shaft 25 and is fixed to the shaft to rotate with it and with arm 35. Bin 53 rests on ring 54 seated in a circumferential groove in shaft 25. The floor of bin 53 has a connecting chute 55 reaching into opening 48 in the arm. Cross-supports 23 hold scraper blades 56 which extend into bin 53 almost to its floor and are stationary. As the bin rotates with shaft 25, scraper blades 56 push the particulate batch material into chute 55 and thus into arm 35.

If desired, the relative open area of slip 50 or other exit means may be adjusted to vary the amount of discharge through the slit or to compensate for the flow characteristics of the particular batch material used. In the embodiment illustrated, a series of closure plates 57 are aligned end-to-end to one side of slit 50. By means of set bolts 58 which pass through slots 60 in plates 57 to engage threaded openings in arm 35, the position of each plate 57 over slit 50 can be adjusted to meet various requirements of flow. This is accomplished merely by loosening bolts 58, positioning a plate 57 as may be desired, and then retightening bolts 58.

In the production of certain glass products, it is desirable to tap a glass-melting furnace continuously rather than intermittently. This is particularly true in the case of high melting point refractory materials like kaolin, since periodic shut-down of a furnace in order to tap the furnace of molten material results in solidification of the charge in which electrodes or other heating elements may become embedded. This, in turn, introduces operating difficulties in re-starting the furnace. One technique used to provide for continuous tapping of a glass melting furnace is a needle valve type of flow control in which a needle, referred to in the art as a cane, reciprocably moves in and out of an outlet orifice in order to control the outlet flow of melted glass. An example of this type of structure is shown in U.S. Pat. No. 1,928,598 to Morton et al.

The present apparatus is uniquely adapted to embody this type of controlled and continuous outlet flow. As shown in FIG. 1, a cane 15 of molybdenum slides through hollow shaft 25 and has a lower reduced portion which cooperates with the reduced opening 14 of outlet 13 in the flloor of furnace F. The cane 15 may be vertically reciprocated and cooled by circulating water by means known in the art.

As arm 35 rotates, it leaves a trail of particulate batch, generally represented at B, afloat over previously melted batch, generally indicated at M. The trail is at least as wide as the slit 50 is long. The deposition of batch is uniform and forms a thin layer which spreads out and completely covers the open area of furnace F. In time, batch B fuses and becomes part of melt M, only to be replaced by additional batch from arm 35.

Various modifications are possible with the present apparatus. Instead of a continuous slit 50, the exit means may take other forms such as aperatures spaced along the arm. The exit means need not be placed at the bottom of the arm. FIG. 7 illustrates a modification in which a distributing arm 61 is similar to arm 35 except that arm 61 is open in an upward direction, and at least one side of the open arm is fluted or notched as at 62 to define exit means. In this case, the supply of batch fills arm 61 until it reaches the lower extremities of notches 62 when the batch overflows along the arm and into furnace F. The remaining parts which are similar to corresponding parts of the arm of FIG. 1 have been designated with like reference numbers.

The embodiment of FIG. 8 shows a different support arrangement for the hollow tube 25 and includes as well a pivotal mounting of the distributing arm to provide vertical tracking freedom for the arm. Parts of the embodiment of FIG. 8 corresponding to similar parts of the embodiment of FIGS. 1 through 6 have been indicated by the same reference numbers. In FIG. 8 a laterally extending support beam 63 terminates in a bearing sleeve 64 having an outwardly directed flange 65. The hollow tube 25 is mounted for rotation in sleeve 64 and is held within the sleeve by locking rings 28 and driven by a sprocket 33 and chain 34 arrangement as before. The circular bin 53 is fitted onto tube 25 to rotate with it and receives particulate batch from a feeding tube 51 having a screw conveyor 52. Flange 65 supports a single scraper blade 66 by a threaded stud and wing nut fastener, generally represented at 67, the blade 66 extending into bin 53 to insure transport of the batch through rectangular opening 48 to arm 35a. A cane 15 may be vertically reciprocated through tube 25 by means known in the art as before.

The arm 35a and its screw conveyor 40 and roller 45 may be identical to the distributing arm illustrated in FIGS. 1 through 6 except for the manner of attaching the arm to tube 25. In this embodiment, tube 25 has a pair of parallel ears 68 welded on opposite diametral points, and an inner bearing 70 for shaft 41 of the screw conveyor 40 has oppositely directed pins 71 which are pivotally carried by the ears. In this manner, arm 35a is free to move in a vertical plane up or down in the direction of arrows 72 as may be required if roller 45 does not travel in an even horizontal plane. At times warpage of track 46 may occur as during installation or from excessive furnace heat. The structure of FIG. 8 enables the distributing arm and accompanying roller to accomodate themselves readily to a non-planar track.

The previously described embodiments illustrate the use of a drive arrangement located substantially at the inner end of a distributing arm, the use of only one arm, and a temporary storage bin which rotates with the arm. The embodiment of FIG. 9 illustrates a drive arrangement which is located substantially at the outer end of the arm, the use of a plurality of distributing arms, and a bin which moves relatively to the arms. Each modification may, if desired, be used independently of the other. The same type of furnace may be used equipped with a circular track 46. An arm 35b together with its screw conveyor 40 and roller 45 on a common shaft 41 may also be substantially the same as illustrated and described for the embodiment of FIGS. 1 through 6, with the chief exceptions being that screw conveyor 40 moves particulate batch from right to left for counterclockwise rotation of arm 35b as viewed in FIG. 9, and for the manner of mounting the inner end of arm 35b. In the embodiment illustrated, four distributing arms 35b are spaced 90° apart forming a spider arrangement and have their common inner ends joined in mutual support by a collar 73. Shaft 41 of the screw conveyor passes through end plate 36 of each arm and is suitably carried for rotation by collar 73. If a furnace of the type of FIG. 1 is used, collar 73 is oversized with respect to a cane 15 to pass it freely and leave an annular area therebetween.

In FIG. 9, the bin from which particulate batch is advanced to arms 35b comprises a ring 74 of L-shaped cross-section which extends entirely around the furnace and has a somewhat greater diameter than the opening of the furnace through which batch is dropped. The floor of bin 74 rests on rollers 45 of each arm 35b and has a downwardly extending lip 75 which retains the bins in a desired position over rollers 45 and arms 35b. A retainer ring 79 which extends around the outer periphery of track 46 keeps the rollers and arms in position over the furnace. One or more feeding tubes 76 having a concentric screw conveyor 77 advances particulate batch to the circular pocket formed by the L-shaped bin. Each arm 35b has a rectangular opening 48a adjacent its outer end and an angled scraper blade 78 fixed to each arm adjacent the rectangular opening. The outer end of each blade 78 extends over the floor of bin 74 to catch and direct batch into opening 48a.

The drive means for rotating arms 35b in FIG. 9 is located at the outer end of the arms and outboard of the furnace proper. A standard electric motor 80 drives a bevel gear 81 which engages the teeth of a circular rack 82 that is fixed to the underside of circular bin 74 and extends entirely around the bin. As bin 74 rotates about a central vertical axis, it drives arms 35b also about a central vertical axis by virtue of the frictional contact between the floor of the bin and rollers 45 on each arm. Because of the indicated mechanical arrangement, bin 74 moves at a faster rate than arms 35b, so that the angular velocities of the bin and arms (the latter travelling in unison like spokes of a wheel) are different. This difference in relative angular velocities also enables the scraper blades 78 to perform their function of pushing particulate batch from bin 74 into openings 48 of the arms. Screw conveyors 40 move the batch along arms 35b as before from which the batch drops through exit means in the arms and into the furnace.

If desired, bin 74 and arms 35b can rotate in opposite directions. For example, a pinion gear may be placed between the floor of bin 75 and rollers 45 to engage a suitable pinion rack and peripheral teeth, respectively, of those members.

Although the foregoing described several embodiments of the present invention, it is understood that the invention may be practiced in still other forms within the scope of the following claims.

We claim:

1. Glass melting apparatus and means for advancing particulate material to said apparatus, comprising: a glass-melting receiver adapted to melt the material having an inlet to receive it and an outlet to discharge molten glass, cane means reciprocably mounted above the receiver and in substantially vertical alignment with said outlet adapted to move axially in either direction into and out of said outlet to close and open the outlet and thereby affect said molten glass discharge, hollow drive shaft means telescopically receiving the cane means and supported with respect to the receiver for rotary movement about a longitudinal axis while accomodating said axial movement of the cane means, means to rotate the shaft means, a distributing arm secured to the drive shaft means to turn therewith and extending from a central area of said inlet of the receiver to a peripheral area of the inlet, said arm having trough means to receive said material which extends longitudinally along the arm, means for advancing said material along said trough means, exit means on said arm to release the material from the arm through said inlet, and roller means on the outer end of said distributing arm adapted to ride about the periphery of said inlet.

2. Apparatus of claim 1 including means for advancing said material into the trough means.

3. Apparatus of claim 1 in which said means for advancing the material along the trough means is actuated by movement of said roller means.

4. Apparatus of claim 1 in which said exit means for the arm extends longitudinally along the arm.

5. Apparatus of claim 1 in which said exit means for the arm extends longitudinally along the arm, and including adjusting means carried with respect to said arm for varying the amount of discharge through said exit means.

6. Apparatus of claim 1 in which said arm is open along its length in an upward direction, and said exit means for the arm extends longitudinally along the side thereof to discharge said material laterally of the arm.

7. Apparatus of claim 1 in which said means for rotating the arm is located substantially at the inner end of the arm.

8. Apparatus of claim 1 in which said means for rotating the arm is located substantially at the outer end of the arm.

9. The apparatus of claim 1 including bin means adapted initially to receive said particulate matter, and scraper means supported with respect to the bin means for moving said material from the bin means to the distributing arm.

10. The apparatus of claim 1 including bin means secured with respect to the distributing arm and adapted to rotate therewith in a generally horizontal plane, and fixed scraper plates extending into the bin means adapted to move said material from the bin means to the distributing arm as the bin means and arm rotate.

11. The apparatus of claim 1 in which said means for advancing the material along the trough means is a screw conveyor, and said conveyor and roller means are mounted on a common shaft.

12. The apparatus of claim 1 in which the distributing arm is free to pivot in a vertically disposed plane about its inner end.

13. The apparatus of claim 1 including continuous bin means extending around the periphery described by said arm during its turning adapted to receive said particulate material, means for rotating the bin means about a vertically disposed axis, a drive connection between the bin means and said roller means adapted to turn the roller means and move the arm at a different angular velocity than that of the bin means, and means for advancing said particulate matter from the bin means to the distributing arm.

14. The apparatus of claim 13 in which said means for advancing the particulate matter from the bin means to the distributing arm includes scraper means carried by the arm and extending to the bin means, whereby a differential rate of angular velocity between said arm and bin means moves said material from the bin means to the arm.

15. The apparatus of claim 13 including a plurality of said distributing arms, and means for joining their common inner ends in mutual support.

16. The apparatus of claim 13 including a plurality of said distributing arms, means for joining their common inner ends in mutual support, the rollers of said plurality of arms supporting the continuous bin means, and means on the bin means for retaining said bin means with respect to the rollers.

17. Apparatus of claim 1 in which said distributing arm extends radially from an inner to an outer end thereof in a generally horizontal plane, said arm contains conveyor means for advancing said material along the trough means, and said roller means is mechanically joined to the conveyor means in the trough of the arm to actuate it upon turning of the roller.

* * * * *